United States Patent Office 3,380,950
Patented Apr. 30, 1968

3,380,950
POLYURETHANE LACQUERS
Friedrich Blomeyer, Cologne-Stammheim, Germany, assignor to Farbenfabriken Bayer Aktiengesellschaft, Leverkusen, Germany, a German corporation
No Drawing. Filed Apr. 30, 1964, Ser. No. 363,979
Claims priority, application Germany, May 3, 1963,
F 39,646
7 Claims. (Cl. 260—31.2)

This invention relates to polyurethane lacquers and more particularly to moisture-cured single-component polyurethane lacquers.

In preparing air-cured polyurethane lacquers, two separate components dissolved in suitable solvents are first prepared, one of which contains free isocyanate groups and the other contains active hydrogen containing groups. Such lacquers have been known as two-component lacquers, because the components are stored separately and combined just before the lacquer is to be applied. In using such a lacquer, the component having —NCO groups and the one containing active hydrogen containing groups are mixed and immediately applied as a film to a substrate where chemical reaction continues with the formation of a solid film. Because of chemical reaction of the components, the viscosity of the mixture increases slowly and soon reaches a stage at which it is no longer possible to spread the lacquer mixture. Despite this limited working time, two-component lacquers are very widely used, since the starting components are individually stable in storage and the component containing hydroxyl groups can be pigmented as desired by the process usual in the lacquer industry, although only those pigments which do not accelerate the polyaddition reaction and thus shorten the working time of the lacquer mixture should be employed.

Since it is inconvenient to store the two-components of the lacquer separately, mix them only immediately before the lacquer is to be used and then to use the mixture rapidly before any substantial amount of chemical reaction, efforts have been made to develop a moisture-cured, single-component polyurethane lacquer. In such moisture-cured, single-component systems, a polyurethane reaction product is prepared by reacting an organic polyisocyanate with an organic compound having reactive hydrogen and this product is then applied to a surface where it reacts with water in the air to form a solid urea side reaction product.

However, the production of such storage-stable moisture-cured, single-component urethane lacquers is only possible under strictly controlled manufacturing conditions, for example, requiring the use of a closed apparatus to insure the exclusion of moisture. Further, completely anhydrous starting materials and solvents must be used therefor, necessitating the dehydration of the solvents and the polyalcohols dissolved therein. Such dehydration is usually achieved by azeotropic distillation requiring considerable expense due to the type of equipment required therefor. Where pigmented, moisture-cured, single-component polyurethane lacquers are to be produced, the manufacture thereof is even more difficult because the pigments and fillers required in the preparation of such lacquers contain a substantial amount of water and absorb even more water during storage until they become saturated therewith. Although pigments and fillers may be dried by known methods, such as by heating, by treatment with water-destroying substances such as toluylene diisocyanate, or by suspension in xylene and subsequent azeotropic distillation, the dry pigments and fillers obtained in this way can only be incorporated into the moisture-cured, single-component polyurethane lacquer when atmospheric humidity is excluded and this can only be done by using a ball mill.

However, it is well known that the addition of sodium aluminum silicates will prevent the effect of moisture in combinations of liquid polyisocyanates and liquid compounds containing reactive hydrogen-containing groups and make it possible to dispense with the complicated drying procedure otherwise required. Nevertheless, the use of these molecular sieves to adsorb the water has a marked disadvantage since the sodium aluminum silicates are powder substances which prevent the polyurethane product from being clear and transparent or translucent. A further disadvantage of the sodium aluminum silicates is that the "pot life" or working time of the pigmented, moisture-cured, single-component polyurethane lacquers is still restricted.

It is therefore an object of this invention to provide a moisture-cured, single-component polyurethane lacquer which is devoid of the foregoing disadvantages. A further object of this invention is to provide a storage-stable, one-component polyurethane lacquer composition stable to the moisture of the air. A still further object of this invention is to provide single-component polyurethane lacquers to which pigments and fillers may be added without detrimentally effecting the lacquer due to the water introduced therewith. Yet another object of this invention is to provide a polyurethane composition which will yield a lacquer having a high chemical resistance, good abrasive strength, and high elasticity. Still another object of this invention is to provide a novel method of guarding against premature curing of a polyurethane-based lacquer composition because of reaction with water.

These and other objects which will become apparent from the following description are accomplished in accordance with this invention, generally speaking, by providing moisture-curable, single-component polyurethane lacquer compositions containing in a suitable solvent the reaction product of an organic polyisocyanate and an organic compound containing at least two active hydrogen containing groups and a hydrolyzable ester. The lacquers provided by this invention may or may not contain pigments and fillers. The esters with which this invention is concerned are hydrolyzed by traces of water with the elimination of an alcohol, and thus act as water-binding agents for the stabilization of moisture-cured, single-component polyurethane lacquer compositions in organic solvents, including those compositions which contain pigments and fillers.

Any suitable esters which are hydrolyzed by traces of water with the elimination of alcohol in the lacquer composition may be used in the practice of this invention, and some such specifically contemplated esters include alkyl orthoformates and particularly the lower alkyl orthoformates such as trimethyl orthoformate, triethyl orthoformate, and tributyl orthoformate; trichlorotriethyl phosphite and tetraalkyl orthosilicates such as tetraethyl orthosilicate. Suitable alkyl orthoformates (or otherwise called trialkyl orthoformates) are trimethyl orthoformate, triethyl orthoformate, monomethyldiethyl orthoformate, dimethylmonoethyl orthoformate, propyl orthoformate, tripropyl orthoformate, diethylmonopropyl orthoformate, dipropylmonoethyl orthoformate, triisopropyl orthoformate, tributyl orthoformate, triisobutyl orthoformate, tripentyl orthoformate, triisopentyl orthoformate, dipropyl-monoisopentyl orthoformate and diisopentylmonopropyl orthoformate. Suitable tetraalkyl orthosilicates are for instance tetramethyl orthosilicate, tetraethyl orthosilicate, tetrapropyl orthosilicate, tetraisopropyl orthosilicate, tetrabutyl orthosilicate, tetraisobutyl orthosilicate, tetraisoamyl orthosilicate. Best results are obtained with trimethyl orthoformate, triethyl orthoformate, tributyl orthoformate, tetraethyl orthosilicate and trichlorotriethyl phosphite.

The esters listed herein differ greatly in their speed of hydrolysis in the weakly acidic pH range in which the hydrolysis proceeds. For example, the splitting of alkyl orthoformates into alcohol and formic acid esters takes place in a relatively short time in a weakly acidic range whereas trichlorotriethyl phosphite only takes up water slowly, splitting into ethylene chlorohydrin and dichlorodiethyl phosphite. Although the hydrolysis process may be slow, trichlorotriethyl phosphite may still be used to stabilize moisture-cured, single-component polyurethane lacquers if these lacquers are produced in the manner henceforth described.

The orthosilicates which react quickly with water in a weak alkaline range, also show the stabilizing effect required herein in a weakly acidic range. In marked contrast to the alkyl orthoformates and trichlorotriethyl phosphite, however, the cleavage products of orthosilicate esters may cause milky turbidity in a clear, moisture-cured, single-component polyurethane lacquer and care must be exercised in their use, therefore.

The hydrolysis products of the esters of this invention may occasionally react with free isocyanate groups, thus breaking the polymeric chain and producing an effect similar to that of a plasticizer. By this means, the mechanical film properties and chemical strength of the polymer may be greatly influenced and lacquers having high chemical resistance, good abrasive strength and high elasticity may be thus produced. In the manufacture of polyurethanes wherein such properties are a major consideration, it should be noted that of the esters recommended herein the alkyl orthoformates have the least plasticizing effect on the lacquer.

The quantity of the water-binding agent to be added to a moisture-cured, clear or pigmented, single-component polyurethane lacquer depends upon the water-binding agent itself and on the water content of the lacquer composition. For example, under the reaction conditions indicated herein trichlorotriethyl phosphite takes up only one mol of water as do the alkyl orthoformates initially, although the resultant formic acid ester product of the hydrolysis of an alkyl orthoformate may be further hydrolyzed thereafter. The orthosilicate water-combining agent takes up two mols of water.

For the purpose of producing a stable, anhydrous, moisture-cured single-component polyurethane lacquer, the water content of the lacquer composition is determined fully by the water content of the solvent and the active hydrogen containing starting material which may contain as little as 0.5% of water to render them useless in a stable, moisture-cured, single-component, polyurethane lacquer composition. However, a complicated dehydration process will not be required when the water-binding agents of this invention are employed as a stabilizer for such lacquer mixtures. One to 2% by weight of the total lacquer composition of the water-binding agent should be added to efficiently stabilize the lacquer composition although larger quantities must be added to pigmented, moisture-cured, single-component systems, because the moisture content due to the addition of the pigment may be as high as 1% or even higher. Consequently, in some cases, the quantity of the water-binding ester to be added fluctuates within a relatively wide range and may be from about 1.5 to about 4% by weight of the total lacquer mixture, which mixture includes the binder, solvent and pigment. Lacquer mixtures having dispersed therein fillers such as colloidally-dispersed silica, which may have a water content of about 4% or more require the addition of even larger quantities of the hydrolyzable ester. In such instances, the fillers are preferably dehydrated by heating before use.

Moisture-cured, single-component, polyurethane lacquers are the reaction products of a low molecular weight polyisocyanate and a compound containing at least two active hydrogen containing groups as determined by the Zerewitinoff method. The term low molecular weight as used herein does not only refer to monomers in the usual sense but includes free NCO-groups containing addition products of monomeric polyisocyanates as well as of dimerised and trimerised polyisocyanates for instance those described below. It does not refer to high molecular weight "semi"-plastics with some free NCO-groups. Critical and of importance is not the molecular weight of the suitable polyisocyanate itself but the ability to produce still soluble or liquid prepolymers. This is in general always achieved with polyisocyanates of a molecular weight up to 1200. Suitable polyisocyanates with still a higher molecular weight will sometimes also result in soluble and liquid prepolymers. Any suitable polyisocyanate having sufficiently low molecular weight may be used in the production of these prepolymers; some such suitable polyisocyanates including substantially all of those listed in Annalen 562, 75 (1949). Specific examples of suitable polyisocyanates are the polymethylene diisocyanates such as tetra- and hexa-methylene diisocyanates; aliphatic diisocyanates containing aromatic or hydroaromatic ring systems such as $\omega,\omega'$-diisocyanate-1,3-dimethyl benzene, 1,4-diisocyanato-hexahydrobenzene, bis-1,4-diisocyanato-hexahydrobenzene and cyclohexylmethane-4,4'-diisocyanate; mixed aromatic and aliphatic diisocyanates such as 3-phenylisocyanate-1-ethylisocyanate and diisocyanates of benzene and its homologues such as industrial toluylene diisocyanate mixtures, 2,4-toluylene diisocyanate, technical and pure dimethylmethane-4,4'-diisocyanate, 3,3' - dimethyldiphenylmethane - 4,4' - diisocyanate - diphenyl-dimethylmethane-4,4'-diisocyanate and 1,1-diphenyl cyclohexyl-4,4'-diisocyanate. Instead of or concurrently with the simple polyisocyanates, one may also use prepolymers such as those prepared by the reflux between a molar excess of a polyisocyanate, generally a diisocyanate, and a compound containing at least two reactive hydrogen containing groups as determined by the Zerewitinoff method.

Some such suitable prepolymers can be obtained from the reaction between an excess of polyisocyanate, mainly hexamethylene diisocyanate, toluylene diisocyanate and diphenylmethane diisocyanate and polyhydric alcohols such as, for example, ethylene glycol, diethylene glycol, butylene glycol, glycerol, trimethylolpropane, hexanetriol, polypropylene glycol, polyethylene glycol; castor oil; polyesters containing hydroxyl groups and natural oils and fats which have been subjected to alcoholysis.

It is also possible to use polyfunctional polyisocyanates produced from polyfunctional isocyanates, advantageously diisocyanates, and a small amount of water with biuret formation. Thus, a liquid biuret triisocyanate is obtained from three mols of hexamethylene diisocyanate and about one mol of water. Furthermore, polycarbodiimides with terminal free isocyanate groups, which are produced from polyisocyanates using such catalysts as phosphine oxides, are also suitable for the production of moisture-cured, single-component polyurethane lacquers. Some such suitable polycarbodiimides are, for example, obtained from an isomeric mixture of cyclohexylene-1,4-diisocyanate or dicyclohexylmethane-4,4'-diisocyanate. Polyvalent polyisocyanates which are obtained by dimerization or trimerization of diisocyanates may likewise be employed.

Mixtures of the above-enumerated polyvalent isocyanates with one another may also be used in the production of moisture-cured, single-component, polyurethane lacquers. One may use those polyisocyanates which are obtained by a reaction between an organic diisocyanate and a polyvalent carboxylic acid.

Any suitable organic compound containing at least two active hydrogen containing groups as determined by the Zerewitinoff method, said groups being reactive with an isocyanate group, may be reacted with an organic polyisocyanate in accordance with the process of the present invention. The active hydrogen atoms are usually attached to oxygen, nitrogen or sulfur atoms. Thus, suitable active hydrogen containing groups as determined by the Zerewitinoff method which are reactive with an isocyanate group include —OH, —NH$_2$, —NH—, —COOH, —SH, and the like. Examples of suitable types of organic compounds containing at least two active hydrogen containing groups which are reactive with an isocyanate group are hydroxyl polyesters, polyhydric polyalkylene ethers, polyhydric polythioethers, polyacetals, aliphatic polyols, including alkane, alkene, and alkyne diols, triols, tetrols, and the like, aliphatic thiols including alkane, alkene and alkyne thiols having two or more —SH groups; polyamines including both aromatic aliphatic and heterocyclic diamines, triamines, tetraamines, and the like; as well as mixtures thereof. Addition products of alkylene oxides with ammonia or with amines and hydrazines such as triethanolamine or triisopropanolamine should generally only be used in limited quantities, since they can otherwise cause undesired side reactions. Of course, compounds which contain two or more different groups within the above-defined classes may also be used in accordance with the process of the present invention such as, for example, amino alcohols which contain an amino group and a hydroxyl group, amino alcohols which contain two amino groups and one hydroxyl group and the like. Also, compounds may be used which contain one —SH group and one —OH group or two —OH groups and one —SH group as well as those which contain an amino group and a —SH group and the like.

The molecular weight of the organic compound containing at least two active hydrogen containing groups is not critical. Preferably, however, at least one of the organic compounds containing at least two active hydrogen containing groups which is used in the production of the polyurethane plastic has a molecular weight of at least about 200 and preferably between about 500 and about 5,000 with a hydroxyl number within the range of from about 25 to about 800 and acid numbers, where applicable, below about 5. A satisfactory upper limit for the molecular weight of the organic compound containing at least two active hydrogen containing groups is about 10,000 but this limitation is not critical so long as satisfactory mixing of the organic compound containing at least two active hydrogen containing groups with the organic polyisocyanate can be obtained. In addition to the high molecular weight organic compound containing at least two active hydrogen containing groups, it is desirable to use an organic compound of this type having a molecular weight below about 750 and preferably below about 500. Aliphatic diols and triols are most preferred for this purpose.

Any suitable hydroxyl polyester may be used, such as are obtained, for example, from polycarboxylic acids and polyhydric alcohols. Any suitable polycarboxylic acid may be used such as, for example, oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, alpha-hydromuconic acid, beta-hydromuconic acid, alpha-butyl-alpha-ethyl-glutaric acid, alpha,beta-diethylsuccinic acid, isophthalic acid, terephthalic acid, hemimellitic acid, trimellitic acid, trimesic acid, mellophanic acid, prehnitic acid, pyromellitic acid, benzenepentacarboxylic acid, 1,4-cyclohexanedicarboxylic acid, 3,4,9,10-perylenetetracarboxylic acid, and the like. Any suitable polyhydric alcohol may be used, such as, for example, ethylene glycol, 1,3-propylene glycol, 1,2-propylene glycol, 1,4-butylene g'ycol, 1,3-butylene glycol, 1,2-butylene glycol, 1,5-pentane diol, 1,4-pentane diol, 1,3-pentane diol, 1,6-hexane diol, 1,7-heptane diol glycerine, trimethylolpropane, 1,3,6-hexanetriol, triethanolamine, pentaerythritol, sorbitol and the like.

Any suitable polyhydric polyalkylene ether may be used, such as, for example, the condensation product of an alkylene oxide or of an alkylene oxide with a polyhydric alcohol. Any suitable polyhydric alcohol may be used such as those disclosed above for use in the preparation of the hydroxyl polyesters. Any suitable alkylene oxide may be used such as, for example, ethylene oxide, propylene oxide, butylene oxide, amylene oxide and the like. Of course, the polyhydric polyalkylene ethers can be prepared from other starting materials such as, for example, tetrahydrofuran, epihalohydrins such as, for example, epichlorohydrin and the like as well as aralkylene oxides such as, for example, styrene oxide and the like. The polyhydric polyalkylene ethers may have either primary or secondary hydroxyl groups and preferably are polyhydric polyalkylene ethers prepared from alkylene oxides having from two to five carbon atoms, such as, for example, polyethylene ether glycols, polypropylene ether glycols, polybutylene ether glycols and the like. It is often advantageous to employ some trihydric or higher polyhydric alcohol such as glycerine, trimethylolpropane, pentaerythritol, and the like in the preparation of the polyhydric polyalkylene ethers so that some branching exists in the product. Generally speaking, it is advantageous to condense from about 5 to about 30 mols of alkylene oxide per functional group of the trihydric or higher polyhydric alcohol. The polyhydric polyalkylene ethers may be prepared by any known process such as, for example, the process disclosed by Wurtz in 1859 and in Encyclopedia of Chemical Technology, volume 7, pages 257 to 262, published by Interscience Publishers, Inc. (1951), or in U.S. Patent 1,922,459.

Any suitable polyhydric polythioether may be used such as, for example, the condensation product of thiodiglycol or the reaction product of a polyhydric alcohol such as is disclosed above for the preparation of the hydroxyl polyesters with any other suitable thioether glycol. Other suitable polyhydric polythioethers are disclosed in U.S. Patents 2,862,972 and 3,900,368.

The hydroxyl polyester may also be a polyesteramide, such as is obtained, for example, by including some amine or amino alcohol in the reactants for the preparation of the polyesters. Thus, polyester amides may be obtained by condensing an amino alcohol such as ethanolamine, with the polycarboxylic acids set forth above or they may be made using the same components that make up the hydroxyl polyester with only a portion of the components being a diamine such as, ethylene diamine and the like.

Any suitable polyacetal may be used such as, for example, the reaction product of formaldehyde or other suitable aldehyde with a polyhydric alcohol such as those disclosed above for use in the preparation of the hydroxyl polyesters.

Any suitable aliphatic polyol may be used such as, for example, alkane diols, such as, for example, ethylene glycol, 1,3-propylene glycol, 1,2-propylene glycol, 1,4-butylene glycol, 1,3-butylene glycol, 1,5-pentane diol, 1,4-butane diol, 1,3-pentane diol, 1,6-hexane diol, 1,7-heptane diol, 2,2 - dimethyl-1,3-propane diol, 1,8-octane diol and the like including 1,20-eicosane diol and the like; alkene diols such as for example, 1-butene-1,4-diol, 1,3-butadiene-1,4-diol, 2-pentene-1,5-diol, 2-hexene-1,6-diol, 2-heptene-1,7-diol, and the like; alkyne diols such as, for example, 2-butyne - 1,4 - diol, 1,5-hexadiene-1,6-diol, and the like; alkane triols such as, for example, 1,3,6-hexane triol, 1,3,7-heptane triol, 1,4,8-octane triol, 1,6,12-dodecane triol and the like; alkene triols, such as, 1-hexene-1,3,6-triol and the like; alkyene triols, such as 2-hexyne-1,3,6-triol, and the like; alkane tetrols such as, for example, 1,2,5,6-hexane tetrol, and the like; alkene tetrols such as, for example, 3-heptene-1,2,6,7-tetrol and the like; alkyne tetrols such as, for example, 4-octyne-1,2,7,8-tetrol and the like.

Any suitable aliphatic thiol including alkane thiols containing two or more —SH groups may be used such as, for example, 1,2-ethane dithiol, 1,2-propane dithiol, 1,3-propane dithiol, 1,6-hexane dithiol, 1,3,6-hexane trithiol and the like; alkene thiols such as, for example, 2-butene-1,4-dithiol and the like; alkyne thiols such as, for example, 3-hexyne-1,6-dithio and the like.

Other alcohol compounds which do not necessarily fit within any of the previously set forth classes of compounds and which nevertheless contain active hydrogen containing groups which are quite suitable for the production of the polyurethane plastics of the present invention are pentaerythritol, sorbitol, mannitol, as well as compounds of any of the classes set forth above which are substituted with halogen such as, for example, chloro, bromo, iodo, and the like; nitro; alkoxy such as, for example, methoxy, ethoxy, propoxy, butoxy and the like; carboalkoxy such as, for example, carbomethoxy, carbethoxy and the like; thiocarbonyl, phosphoryl, phosphato and the like.

Polyhydroxyl compounds obtained by the alcoholysis of natural fats and oils such as, for example, castor oil may also be used.

In order to produce moisture-cured, single-component polyurethane lacquers, the polyisocyanate and the active hydrogen containing compounds are combined in such proportions that the reaction products contain free —NCO groups and are either liquid or soluble when the reaction has taken place in the absence of moisture. Such liquid or soluble prepolymers are formed when an NCO/OH ratio of about 2.0 to about 2.2 is used, but when diisocyanates are employed, an NCO/OH ratio of about 1.4 may be used to prepare prepolymers which are still soluble. When isocyanates containing 3 or more NCO groups are employed, an NCO/OH ratio of from 5:1 to 40:1 may be used and suitable prepolymers are still obtained.

Any suitable solvent may be used in the preparation of the lacquer mixtures, and may be the same, substantially anhydrous, solvents as are employed in two-component polyurethane lacquers. Examples of some such solvents are esters such as methoxybutyl acetate, ethylene glycol monoethyl ether acetate, ethylene glycol monoethyl ether acetate, butyl acetate, ethyl acetate; ketones such as cyclohexanone, methyl isobutyl ketone or methyl ethyl ketone; halogenated hydrocarbons such as methylene chloride and trichloroethylene, aromatic compounds such as xylene and toluene, and normal commercial mixed solvents containing aromatic compounds and obtained from the petroleum chemical industry. In addition, any suitable mixture of such solvents may be employed.

The binder content of the lacquer composition is preferably between about 40 and 50% calculated on total weight of the polyurethane lacquer mixture, for solvent-containing lacquers to be used as a brushing lacquer, and about 30% for a spraying lacquer. Agents for improving flow properties such as cellulose esters and ethers, polyvinyl acetate, polyvinyl butyral and viscosity-increasing agents such as nitrocellulose, polyvinyl butyral or copolymers of vinyl acetate and vinyl chloride can also be used.

In order to improve the gloss and the keeping qualities of the gloss, chlorinated diphenol or terephenyl may be added to the lacquer mixture, and in order to prevent bubbles in brushing lacquers, dibutyl fumarate or copolymers of acrylic acid esters and vinyl ethers may also be employed.

Any suitable inert inorganic pigment such as titanium dioxide and iron oxide pigments may be used in accordance with this invention and organic dyestuffs may also be employed, provided they do not initiate any reaction other than the isocyanate/water reaction. Fillers such as sand, chalk and heavy sparror talc may also be used. When concurrently using fillers and pigments with relatively high water contents (greater than 2%), however, either the proportion of the hydrolyzable water-binding agent should be increased or a preliminary drying at relatively high temperatures should be carried out.

Any quantity of pigment and/or filler may be used. When a moisture-cured, single-component, polyurethane lacquer is employed as a priming lacquer, about 150 to 200% based on solid binder may be used, but when the lacquer is used as a top coating lacquer, it has been found to be expedient to reduce this quantity to about 50%.

In the preparation of lacquers, the hydrolyzable ester should preferably be added to the lacquer mixture by first mixing it with the active hydrogen containing compound or a mixture thereof which is thereafter added to the polyisocyanate or a polyisocyanate mixture. The active hydrogen containing compound containing the ester may then be added rapidly to the polyisocyanate while stirring or it may be introduced dropwise and heated and stirred into the polyisocyanate or polyisocyanate mixture.

Since the reaction between the isocyanate group and the active hydrogen containing group is so slow in the presence of the hydrolyzable esters listed herein, it is possible to stir for a short time when adding the active hydrogen containing compound to the polyisocyanate in order to insure uniform mixture. In fact, the hydrolyzable ester stabilizer performs its function so well that the formation of a moisture-cured, single-component polyurethane lacquer can be carried out in simple containers which can be hermetically sealed.

As a consequence, a moisture-cured, single-component polyurethane lacquer may be produced by introducing a pigment using any suitable method such as, for example, by triturating it with a polyhydroxyl compound or a mixture thereof. The polyhydroxyl compound may be used as it is, or it may be in solution with a pigment and possibly a filler mixture. The hydrolyzable ester which reacts chemically with any water present is introduced into this mixture and after trituration, the resultant mixture may then be combined with a polyisocyanate or a polyisocyanate mixture with stirring in a hermetically-sealed container.

Pigmented and filled, as well as clear lacquers, on application react slowly at normal temperatures with a rise in viscosity due to the formation of urea and/or urethane linkages. Generally, the end point of the reaction is reached after about four days; however, with the application of heat, for example, at a temperature of about 70° C., this end point may be reached in about three hours. It has been found, surprisingly, that the storage stability of the lacquer mixture is independent of the trituration method used. It is preferred, however, to use a ball mill for the trituration process since the humidity of the air is thus prevented from unobstructed contact with the composition. Other conventional triturating means such as a three roll stand, a single roll stand, funnel mills and sand mills may be used without impairing the storage stability of the lacquer composition.

Thus, moisture-cured, single-component, polyurethane lacquers may be prepared and stabilized with the addition of water-binding agents which react chemically with any water present. When lacquers are applied to a substrate, film formation proceeds with the aid of the humidity of the air by way of an isocyanate-water reaction with the formation of urea groups. The hardening time depends on the physical nature of the binder and can be shortened by concurrent use of those catalysts which are generally employed in an isocyanate polyaddition reaction. Single-component polyurethane lacquers may also be mixed with polyfunctional polyhydroxyl compounds which act as cross-linking agents just before processing, in which case film formation takes place with the formation of urethane groups.

Moisture-cured, single-component polyurethane lacquers may be applied by any suitable method such as spraying, brushing, casting and dipping. It is also possible to apply the lacquers by the aerosol spray process, electrostatic spraying and heat spraying because of their storage stability.

Lacquer films obtained from moisture-cured, single-component, polyurethane lacquers have several valuable properties which parallel those obtained with the use of urethane lacquers. High chemical resistance, good abrasive strength and high elasticity make these lacquers suitable for painting floors and containers made of wood, metal and concrete. Desirable results are also obtained when these lacquers are used in the production of anti-corrosive paints. The single-component, polyurethane lacquers prepared in accordance with the present invention remain storage stable even if coal tars, asphalts and synthetic resins such as coumarone resin are added and single-component, polyurethane lacquers can also be used as stoving lacquers, for example, for the lacquering of wires.

The invention is further illustrated by the following examples in which the parts are by weight unless otherwise specified.

Example 1

About 36 parts of cellulose acetobutyrate, dissolved in about 712 parts of a mixture of ethylene glycol monomethyl ether acetate, butyl acetate and xylene in the ratio about 3:1:2, are mixed with:

(A) About 360 parts of a polyester of butylene glycol and phthalic anhydride (2.2% OH) and about 360 parts of a linear polypropylene glycol (molecular weight 2,000), (OH number 61), or (B) About 720 parts of a polyester of diethylene glycol and adipic acid (1.3%), or (C) About 720 parts of a polyester according to (A).

In each case, either about 43 parts or about 86 parts of trimethyl, triethyl or tributyl orthoformate or tetraethyl orthosilicate or trichlorotriethyl phosphite or dimethyl monoethyl orthoformate are added, followed in each case, by about 1440 parts of a polyisocyanate prepared by reacting about 3 mols of toluylene diisocyanate and about 1 mol of trimethylol propane (75% dissolved in ethyl acetate). A solution of a single-component polyurethane lacquer in solution containing the water-combining agents is thus formed, the solids content of which is about 62%. The NCO/OH ratio of the lacquers is (A) 5.3; (B) 8.1; and (C) 6.2; and the quantity of water-combining agents added is 1.5% or 3%.

The storage stability of each of these lacquer mixtures exceeds three months and the mechanical properties of the films produced from these lacquers remain substantially uninfluenced by the hydrolyzable esters added as water-binding agents.

The best film hardness is obtained after five days, and films which are ten days old are no longer softened by the action of acetone for sixty seconds.

Example 2

About 20 parts of linear polypropylene glycol (molecular weight 1,000, OH number 112), about 2 parts of butane-1,3-diol and about 4 parts of trimethylol propane are dissolved in about 47 parts of ethyl acetate and about 2 parts of trimethyl orthoformate are added. Triethyl or tributyl orthoformate may also be simultaneously introduced. About 42 parts of cis-1,4-cyclohexylene diisocyanate and about 0.1 parts of a 10% solution of dibutyltin-dilaurate in ethylene glycol monoethyl ether acetate, butyl acetate, ethyl acetate and toluene (1:1:1:1) are then added. The NCO/OH ratio of the lacquer if about 2 and the solids content of the prepared lacquer mixture if about 58%. The storage stability of the single-component polyurethane lacquer exceeds two months. After five days, lacquer films, thus produced, show an Albert-König pendulum hardness of about 138 seconds, an Erichsen value of about 4, and no longer are softened by acetone after having dried for about 14 days.

Example 3

| | A | B | C | D |
|---|---|---|---|---|
| Polyisocyanate with biuret structure obtained from 3 mols of hexamethylene diisocyanate and 1 mol of water according to GP 1101394, 75% dissolved in ethylene glycol monoethyl ether acetate/xylene (1:1) | 80 | 80 | 80 | 80 |
| Polyester of adipic acid and diethylene glycol, 1.4% OH, 50% dissolved in ethylene glycol monoethyl ether acetate, butyl acetate and xylene (3:1:2) | 32 | 48 | | |
| Linear polypropylene glycol, 1.7% OH, 50% dissolved in ethylene glycol monoethyl ether acetate, butyl acetate and xylene (3:1:2) are reacted with one another to form a single-component polyurethane lacquer | | | 16 | 32 |
| NCO/OH ratio | 24 | 16.5 | 37 | 18.5 |
| The binder is then added: | | | | |
| Trimethyl orthoformate | | | | |
| Triethyl orthoformate | 3.4 | 3.9 | 3 | 3.4 |
| Tributyl orthoformate | | | | |
| Solids content in percent | 63 | 61 | 65 | 63 |
| Amount of added orthoester in percent | 2.8 | 2.8 | 2.8 | 2.8 |
| Before processing as a lacquer, zinc octoate (8% zinc), 10% dissolved in ethylene monoethyl ether acetate, butyl acetate and xylene (3:1:2) is added | 8 | 8 | 8 | 8 |
| The lacquer films show pendulum hardness (measured according to Albert-König) in seconds | 140 | 80 | 150 | 130 |

The films are highly elastic and cannot be softened after drying for four days.

Example 4

| | A | B |
|---|---|---|
| Solution I: | | |
| Polypropylene glycol (molecular weight 1,000; OH number 112) | 10 | 10 |
| Butane-1,3-diol | 10 | 10 |
| Trimethylol propane | 20 | 20 |
| Ethyl acetate | 40 | 40 |
| Solution II: | | |
| Toluylene-2,4-diisocyanate | 80 | |
| Toluylene-2,4- and toluylene-2,6-diisocyanate, isomer mixture 80/20 | | 80 |
| Triethyl orthoformate | 4 | 4 |
| Ethyl acetate | 40 | 40 |
| NCO/OH ratio | 1.35 | 1.35 |

Solution II is introduced into a sealed apparatus and brought to the boiling point, Solution I is added dropwise with stirring over a period of about 5 hours. The amount of triethyl orthoformate added is 2% and the solids content is adjusted to 60%. The storage stability of the polyurethane thus produced exceeds 3 months.

Example 5

| | A | B | C | D | E |
|---|---|---|---|---|---|
| Solution I: | | | | | |
| Polyisocyanate as Example 1 | 50 | 50 | 50 | 50 | 50 |
| Solution II: | | | | | |
| Polyester of Example 1b | 15 | 15 | 22.5 | | |
| Polyether of Example 1a | | | | 15 | 15 |
| Epoxide resin based on diphenylol propane and epichlorohydrin epoxy value 0.52 | 10 | | | 10 | |
| Epoxide resin on same basis epoxy value=0.2; 50% in ethylene glycol monoethyl ether actate | | 8 | | | 8 |
| Epoxide resin on same basis epoxy value 0.028; 50% in ethylene glycol monoethyl ether acetate | | | 4 | | |
| Solvent mixture according to Example 1 | 50 | 50 | 50 | 50 | 50 |
| Triethyl orthoformate | 3 | 3 | 3 | 3 | 3 |
| NCO/OH | 8 | 6.4 | 7.3 | 6.7 | 5.6 |
| Solids content in percent | 49 | 45 | 48 | 49 | 45 |

NOTE.—Both solutions are combined to form a single-component lacquer.

About 2.3% of triethyl orthoformate is added.

The storage stability of the lacquer mixture exceeds three months and the lacquer films thus produced are hard, elastic and difficult to dissolve.

Example 6

| | A | B |
|---|---|---|
| Solution I: | | |
| Polyisocyanate as Example 1 | 100 | 100 |
| Solution II: | | |
| Polyester as Example 1b | 40 | |
| Polyether as Example 1a | | 40 |
| Castor oil | 5 | 5 |
| Solvent mixture according to Example 1 | 100 | 100 |
| Triethyl orthoformate | 5 | 5 |

The solutions are combined while stirring to form a single-component polyurethane lacquer mixture which is stored in closed containers. The amount of triethyl orthoformate added is about 2% and the solids content of the solution is 48%. The storage stability of the mixture exceeds four months.

Example 7

|  | A | B |
|---|---|---|
| Solution I: |  |  |
| Polypropylene glycol according to Example 4 | 20 | 20 |
| Butane-1,3-diol | 2 | 2 |
| Trimethylol propane | 4 | 4 |
| Ethyl acetate | 40 | 44 |
| Solution II: |  |  |
| Carbodiimide-modified 1,4-cyclohexylene diisocyanate (33.4% NCO) | 54 | |
| Carbodiimide-modified dicyclohexyl methane-4,4'-diisocyanate (29.7% NCO) | | 62 |
| Triethyl orthoformate | 3.5 | 3.5 |
| Phthalyl chloride | 0.3 | 0.3 |
| Ethyl acetate | 40 | 44 |
| NCO content of the prepared lacquer mixture, percent | 9 | 11 |
| Solids content, percent | 50 | 50 |

Any of the methods of modifying polyisocyanates with carbodiimide are described in Angewandte Chemie, 74, 801–806 (1962) may be employed.

Solution II is brought to the boiling point in a closed apparatus with the exclusion of moisture. Solution I is added dropwise over about a 5 hour period and the solution obtained is stored in the tightly sealed container.

Coatings produced with the use of these single-component polyurethane lacquer mixtures are fast to light.

Example 8

About 9.5 parts of polypropylene glycol according to Example 4, about 9.5 parts of butane-1,3-diol, about 9.5 parts of trimethylol propane and about 3 parts of triethyl orthoformate in about 53 parts of ethyl acetate are combined with about 100 parts of cis-1,4-cyclohexylene diisocyanate while stirring to form a single-component polyurethane lacquer mixture with an NCO content of about 17% and a solid content of about 71%. The mixture is stored in a closed container and its storage stability exceeds two months. The lacquer mixture dries thoroughly on a support with the aid of air humidity and the films which are formed are light fast.

Example 9

About 60 parts of the polyester according to Example 6 or about 60 parts of the polyether according to Example 6 are dissolved together with about 1 part of dibutyl-tin-dilaurate according to Example 2 and about 5 parts of triethyl orthoformate in about 50 parts of ethylene glycol monoethyl ether acetate, butyl acetate and xylene (3:1:2). About 100 parts of technical, liquid 4,4'-diphenyl methane diisocyanate are incorporated by stirring. The amount of triethyl orthoformate added is about 2.3%. The solids content of the single-component polyurethane lacquer mixture is about 74%, and the storage stability exceeds eight weeks when the mixture is stored in tightly sealed containers.

Example 10

Using methods normal in the lacquer industry, involving trituration (funnel mill, three roll stand, single-roll stand or ball mill) and without special precautionary measures, a mixture is prepared from about 95 parts of the polyester of Example 1B, about 30 parts of triethyl orthoformate, about 240 parts of red iron oxide, about 130 parts of talc, about 45 parts of about a 10% solution of a gelling agent consisting of bentonite or montmorillonite (produced with organic bases by cation exchange) in the solvent according to Example 9, and about 40 parts of methoxy butyl acetate and about 200 parts of the solvent mixture of Example 9. The solution is then combined with about 30 parts of about a 20% solution of polyvinyl butyral in ethylene glycol monoethyl ether acetate, about 70 parts of a 20% solution of a copolymer of vinyl chloride and vinyl acetate in ethylene glycol monoethyl ether acetate/cyclohexanone (3:1) and about 230 parts of the polyisocyanate of Example 1, here dissolved in ethylene glycol acetate/xylene (1:1) to form about a 67% solution.

The NCO/OH ratio of the lacquer is about 8 and the amount of triethyl orthoformate added in the single-component polyurethane lacquer is about 2.8%. The pigmentation, calculated on binder, is about 140%. The solids content is about 56.5% and the storage stability of the lacquer mixture, kept in tightly sealed vessels, exceeds eight weeks. When stored under normal temperature conditions, the temperature rises slowly and the viscosity reaches its maximum after one week. The lacquer can be brushed on, diluted with a solvent mixture and adjusted to a consistency suitable for spraying and/or dipping.

Example 11

About 100 parts of the polyester of Example 10 or of the polyether of Example 5 are triturated as described in Example 10 with about 22 parts of triethyl orthoformate, about 140 parts of titanium dioxide, about 3 parts of chlorinated terphenyl (59% chlorine), about 60 parts of methoxybutyl acetate and about 130 parts of the solvent mixture according to Example 10. About 70 parts of the vinyl chloride/vinyl acetate/copolymer according to Example 10, about 230 parts of the polyisocyanate according to Example 10, and, finally, about 5 parts of a low-viscosity copolymer of butyl acrylate and vinyl isobutyl ether (10% in toluene) are added. The NCO/OH ratio of the lacquer component is about 8.1 when using polyester and about 6.2 when using polyether. A lacquer mixture of a single-component polyurethane lacquer suitable for being applied with a brush is obtained with a solids content of about 53%, an orthoformate content of about 3% and a pigmentation (based on binder) of about 52%. The lacquer mixtures can be stored for more than about 8 weeks and they may be brushed and dried on a support with the formation of an elastic film having good resistance to chemical attack.

Example 12

About 24 parts of the polyester of Example 10 or of the polyether of Example 5, are triturated with about 42 parts of titanium dioxide and about 4.5 parts of triethyl orthoformate in about 30 parts of the solvent mixture of Example 10. About 23 parts of the vinyl chloride/vinyl acetate copolymer of Example 10, about 1.6 parts of the low-viscosity copolymer according to Example 11 and about 80 parts of the polyisocyanate according to Example 3 are added. Just before processing, about 0.6 part of zinc octoate (8% zinc; 10% dissolved in toluene) is also added. The single-component polyurethane lacquer mixture has a solids content of about 43%, a pigmentation, based on binder of about 48% and an orthoformate content of about 2.2%. The NCO/OH ratio of the lacquer components is about 6.5 when using a polyester and about 12.5 when using a polyether. The lacquer mixture, which can be stored for more than 8 weeks, produces light-fast and weather-resistant films.

Example 13

About 100 parts of a road tar with a viscosity (measured in a road tar viscometer—10 mm. nozzle) of about 250 to about 500 seconds are liquefied by heating and thereafter gradually stirred into a warmed solvent mixture of about 68 parts of cyclohexanone and about 68 parts of toluene. After cooling, about 14 parts of triethyl orthoformate are added to the homogeneous solution. After standing briefly, about 100 parts of the polyisocyanate of Example 1 are added while stirring (amount of added orthoformate about 4%; solids content about 50%). The solution thus formed is stable when stored in tightly sealed containers and can be processed like a lacquer. Thorough curing of the lacquer with the aid of humidity of the air is accomplished easily and rapidly.

Although the invention has been described in considerable detail in the foregoing, it is to be understood that such detail is solely for the purpose of illustration and that any other suitable polyisocyanate, polyhydroxyl containing compound, solvent, pigment, filler or binder in accordance with the disclosure, may be substituted for those enumerated therein. Further, variations on the foregoing can be made therein without departing from the spirit and scope of the invention except as set forth in the claims.

What is claimed is:

1. A storage-stable, moisture-curable polyurethane lacquer having a substantially clear liquid phase comprising the reaction product of an organic polyisocyanate, a compound containing at least two active hydrogen containing groups as determined by the Zerewitinoff method, an organic solvent for the reaction product and a water binding agent selected from the group consisting of an alkyl orthoformate and tetraethyl othrosilicate.

2. The product of claim 1 wherein the group member is an alkyl orthoformate.

3. The product of claim 1 wherein the group member is tetraethyl orthosilicate.

4. The product of claim 1 wherein the amount of said group member is from about 1.5 to about 4 percent by weight of lacquer.

5. The product of claim 2 in which the alkyl orthoformate is trimethyl orthoformate.

6. The product of claim 2 in which the alkyl orthoformate is triethyl orthoformate.

7. The product of claim 2 in which the alkyl orthoformate is tributyl orthoformate.

References Cited

UNITED STATES PATENTS

| | | | |
|---|---|---|---|
| 3,135,708 | 6/1964 | Muller et al. | 260—33.6 |
| 3,196,026 | 7/1965 | Menard et al. | 260—75 |
| 3,034,996 | 5/1962 | Kaplan | 260—2.5 |
| 3,208,959 | 9/1965 | Gmitter | 260—45.7 |

FOREIGN PATENTS 665,361  6/1963  Canada.

OTHER REFERENCES

Derwent Belgian Patents Report, No. 93A, issued Oct. 19, 1962, p. 6 (copy in 260/2MS Digest).

Noller, "Chemistry of Organic Compounds," second edition, 1957, W. B. Saunders Company, Philadelphia, p. 175, QD 253 N65 1957.

Rose, "The Condensed Chemical Dictionary," fifth edition, 1956, Reinhold Publishing Corp., New York, p. 465, QD–5C5 1956.

MORRIS LIEBMAN, *Primary Examiner.*

B. A. AMERNICK, *Assistant Examiner.*